(12) United States Patent
Yo et al.

(10) Patent No.: US 6,799,501 B2
(45) Date of Patent: Oct. 5, 2004

(54) HIGH SPEED DRIVING METHOD AND APPARATUS OF PRESSURE CYLINDER

(75) Inventors: Seikai Yo, Tsukuba-gun (JP); Nobuhiro Fujiwara, Tsukuba-gun (JP); Daisuke Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 74 days.

(21) Appl. No.: 10/273,130

(22) Filed: Oct. 18, 2002

(65) Prior Publication Data

US 2003/0079602 A1 May 1, 2003

(30) Foreign Application Priority Data

Oct. 26, 2001 (JP) .......................................... 2001-329479

(51) Int. Cl.$^7$ .............................................. F15B 13/16
(52) U.S. Cl. ............................................ 91/361; 91/407
(58) Field of Search .......................... 91/404, 361, 390, 91/405, 407; 219/89

(56) References Cited

U.S. PATENT DOCUMENTS

| | | | | |
|---|---|---|---|---|
| 4,343,228 A | * | 8/1982 | Wallis ........................... | 91/408 |
| 4,643,074 A | * | 2/1987 | Gunda et al. .................. | 91/361 |
| 4,712,470 A | * | 12/1987 | Schmitz ........................ | 91/361 |
| 5,012,722 A | * | 5/1991 | McCormick .................. | 91/361 |
| 5,517,898 A | * | 5/1996 | Kim et al. ..................... | 91/407 |
| 5,857,333 A | * | 1/1999 | Schmidt et al. ............... | 91/361 |

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A pressure cylinder is connected to an air pressure source through a servo valve, the servo valve is controlled as an on/off switching valve by a control section in an advancing working step of a piston rod, and at the time of backward stroke of the piston rod, an operation position of the piston rod is detected by a position detector to feedback a detection signal to the control section, the servo valve is controlled by the control section such that a deviation between the operation position and a preset stopping position is eliminated, the piston rod is stopped at an intermediate stopping position, and a state in which substantially the same pressures are supplied to pressure chambers formed on opposite sides of the piston is maintained.

4 Claims, 4 Drawing Sheets

(A)

(B)

(C)

HIGH SPEED DRIVING METHOD AND APPARATUS OF PRESSURE CYLINDER

TECHNICAL FIELD

The present invention relates to high speed driving method and mechanism of a pressure cylinder which is suitably utilized when a work is pressurized at an end of a stroke like a gun cylinder for spot welding.

RELATED ART

A movable-side electrode driven by a gun cylinder for spot welding is opposed to a work on a stationary-side electrode through a relatively short working stroke, and it is required that spot welding is carried out plural times in minimal time while deviating welding positions.

To satisfy such a requirement, in Japanese Patent Application No.2001-49020 proposed by the present inventors, a mechanism for setting an intermediate stopping position of a piston is provided so that the piston can be stopped at an intermediate position. A totally returning position to which a work moves to the opposed position of a piston rod and an operation preparing position (intermediate stopping position) to which the piston rod is allowed to be opposed to the work through a relatively short working stroke are set in the piston, and when the spot welding is carried out plural times, the working stroke is made as short as possible, and efficiency of operation is enhanced.

However, the intermediate stopping position is stationary, and is always fixed irrespective of a shape of the work and various conditions. That is, as a stopping position when the piston rod is retreated, there are only two positions, i.e., the operation preparing position (intermediate stopping position) and the totally returning position, and even if the work has an uneven portion, the intermediate stopping position can not be changed in accordance with the uneven portion, and it is always necessary to select one of the two positions. As a result, wasteful stroke is generated in accordance with a work shape in some cases and in such a case, there is a problem that the operation time unnecessarily becomes long.

Further, in a conventional pressure cylinder driving mechanism including the above proposed art, if the cylinder is driven by a switching valve, it is necessary to fill a pressure cylinder whose pressure has completely been lowered to atmospheric pressure with compressed air when the cylinder starts its forward or backward stroke. Therefore, it takes time to supply pressure, and the driving operation of the pressure cylinder is delayed correspondingly, and this largely affects the working efficiency.

The above-described problem is seen not only in the spot welding gun cylinder, but also in a device in which a head mounted to a tip end of a piston rod is repeatedly pushed against a work such as a pressure unit of various clamp device, and such a case also has the same problem.

DISCLOSURE OF THE INVENTION

To solve the technical problem, the present invention provides a driving method and a driving apparatus in which a totally returning position and an operation preparing position (intermediate stopping position) to which a piston rod is opposed to a work through a relatively short working stroke are set in the piston rod of a pressure cylinder such as a spot welding gun, the intermediate stopping position can arbitrarily be set by a signal sent from outside so that a waste is not generated in a stroke in accordance with a shape of the work and the like.

To achieve the above object, according to the present invention, there is provided a high speed driving method of a pressure cylinder comprising: an advancing working step for driving a piston of a pressure cylinder by air pressure which is supplied from and discharged from a servo valve to move a piston rod to a forward stroke end, thereby pressurizing the work to carry out a predetermined operation; and an intermediate stopping step for retreating the piston rod to an intermediate stopping position and stopping the piston rod at this position.

The intermediate stopping step comprises: a process for detecting an operation position of the piston rod by a position detector and feeding back a detected position signal to a control apparatus of the servo valve; a process for controlling the servo valve by the compressed air such that a deviation between the detected position signal and a set position signal for intermediate stopping the piston rod becomes zero, thereby intermediate stopping the piston rod at a set position; and a process for maintaining a state in which substantially the same pressures are supplied to pressure chambers on opposite sides of the piston.

In the driving method of the invention, it is preferable that when the advancing working step is started, a given voltage Vmax is supplied to the servo valve to allow the servo valve to function as on/off switching valve. With this, the piston rod can move forward at high speed.

In the driving method of the invention, it is preferable that a speed in the vicinity of an end of the forward stroke of the piston rod is reduced by cushion effect caused by limiting a flow rate of exhaust gas from a rod-side pressure chamber. With this, a tip end of the piston rod can touch a work softly.

When the cushion effect functions, an internal pressure in the rod-side pressure chamber becomes lower than an internal pressure in ahead-side pressure chamber, this acts as a trigger to actuate a quick exhaust valve, the quick exhaust valve directly opens the rod-side pressure chamber into atmosphere to abruptly lower a back pressure of the piston, so that time required until a maximum pressurizing force can be generated by the piston rod is shortened.

According to the present invention, to carry out the driving method, there is provided a high speed driving apparatus of a pressure cylinder, comprising: a pressure cylinder having a piston driven by an air pressure, a piston rod connected to the piston, a head-side pressure chamber and a rod-side pressure chamber formed on opposite sides of the piston; a servo valve connecting both the pressure chambers to an air pressure source; a control section for controlling the servo valve; a position detector for detecting an operation position of the piston rod to feed back a detected position signal to the control section.

The high speed driving apparatus further comprises a control apparatus which functions such that the control section compares the detected position signal fed back from the position detector and a set position signal for intermediate stopping the piston rod as previously set, and controls the servo valve such that a deviation between both the signals becomes zero, thereby intermediate stopping the piston rod at a set position, and a state in which substantially the same pressures are supplied to pressure chambers formed on opposite sides of the piston is maintained.

In the invention, it is preferable that the control section further comprises a signal circuit which supplies a given voltage Vmax to the servo valve when the advancing working step of the piston rod is started to allow the servo valve to function as an on/off switching valve, and a switch which is actuated by the switch signal to selectively connect the signal circuit and the control apparatus to the servo valve.

The pressure cylinder may comprise a cushion mechanism for reducing a speed of the piston rod in the vicinity of the end of the forward stroke of the piston rod, thereby limiting a flow rate of exhaust gas from the rod-side pressure chamber.

Further, it is possible to employ a structure in which a quick exhaust valve is connected to the pressure cylinder, if an internal pressure in the rod-side pressure chamber at the time of the cushion effect functions becomes lower than an internal pressure in the head-side pressure chamber, this acts as a trigger to actuate the quick exhaust valve to directly open the rod-side pressure chamber into atmosphere.

According to the invention having the above structure, the intermediate stopping position of the piston rod can arbitrarily be set by a signal input to the control apparatus from outside. Therefore, if an intermediate stopping position is previously obtained in accordance with a shape of a work and the intermediate stopping position is input as a designated position successively, it is possible to prevent a waste from being generated in stroke.

Further, as described above, since the state in which substantially the same pressures are applied to the pressure chambers formed on the opposite sides of the piston is maintained when the piston rod is returned to the intermediate stopping position, when a projecting stroke is started, it is unnecessary to fill the pressure chamber whose pressure is completely lowered to the atmospheric pressure with compressed air, and it is only necessary to add pressure fluid of necessary amount for previously added pressure fluid. Therefore, there is no driving delay unlike the conventional case in which a pressure chamber is driven by a switching valve, time required for projecting stroke can be shortened and thus, operation efficiency can be enhanced.

DETAILED EXPLANATION

Figure 1:
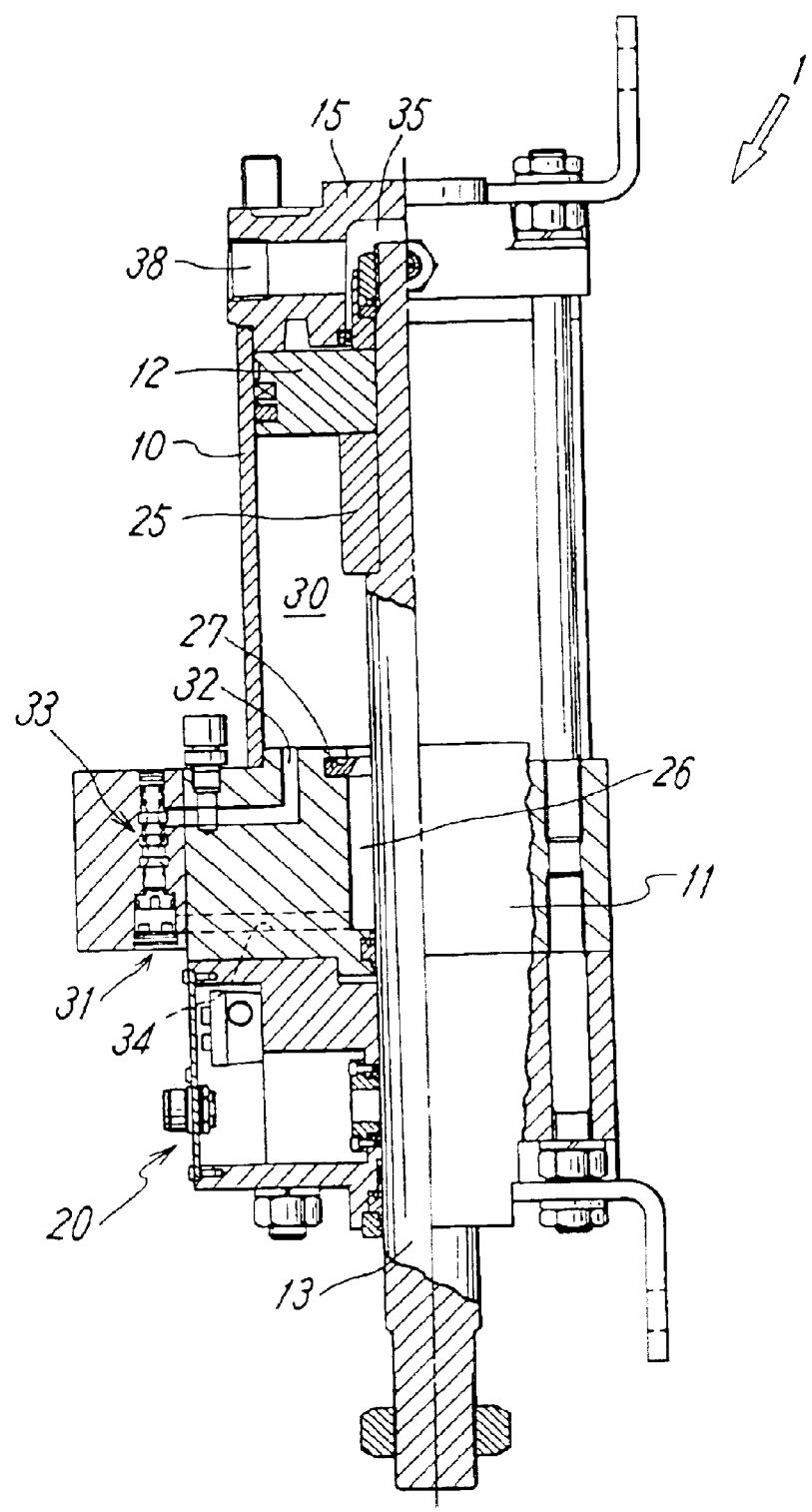
FIG. 1 is a sectional view of an essential portion of an example of a structure of a pressure cylinder.

FIG. 1 shows an example of a structure of a pressure cylinder driven by a high speed driving apparatus of the present invention.

This pressure cylinder 1 is suitably used as a gun cylinder for spot welding. The pressure cylinder 1 comprises a cylinder tube 10 which is provided at its opposite ends with a rod cover 11 and a head cover 15; a piston 12 which slides in the cylinder tube 10 in its axial direction; and a piston rod 13 whose base end is connected to the piston 12. A tip end of the piston rod 13 passes through the rod cover 11 and extends outside. The piston 12 is provided at its opposite ends with a rod-side pressure chamber 30 and a head-side pressure chamber 35. These pressure chambers 30 and 35 are individually brought into communication with supply/discharge ports 31 and 38 provided in the rod cover 11 and the head cover 15. Compressed air is supplied to and discharged from the pressure chambers 30 and 35 through the supply/discharge ports 31 and 38 so that the piston 12 and the piston rod 13 are driven forward and backward. In a forward stroke of the piston rod 13, a work (not shown) is pressurized and is subjected to necessary working such as welding.

The pressure cylinder 1 has a cushion mechanism which reduces speed of the piston 12 in the vicinity of the forward stroke end by limiting a flow rate of exhaust gas from a pressure chamber 30. This cushion mechanism comprises a cushion ring 25 provided on the base end of the piston rod 13 near the piston 12; a recess 26 formed in the rod cover 11 such that the recess 26 is connected to the rod-side pressure chamber 30; a cushion packing 27 provided around an opening of the recess 26; and a throttle valve 33 provided in the rod cover 11.

The cushion packing 27 is brought into contact with an outer peripheral surface of the cushion ring 25 when the cushion ring 25 enters the recess 26, thereby cutting off the direct communication between the recess 26 and the pressure chamber 30. The recess 26 is in communication with the supply/discharge port 31 through a communication hole 34, and at the time of backward stroke of the piston 12, compressed air flows into the pressure chamber 30 from the recess 26 through these supply/discharge port 31 and the communication hole 34. Therefore, cushion packing 27 carries out one direction sealing in which the compressed air is allowed to flow in a direction from the recess 26 toward the pressure chamber 30, but is prevented from flowing from the pressure chamber 30 toward the recess 26.

The rod cover 11 is provided with a flow path 32 which brings the pressure chamber 30 and the supply/discharge port 31 into communication with each other, and the throttle valve 33 is provided in an intermediate portion of the flow path 32. In the vicinity of the forward stroke end of the piston rod 13, when the cushion ring 25 enters the recess 26 and comes into contact with the cushion packing 27 and the communication between the pressure chamber 30 and the recess 26 is cut off, the exhaust gas from the pressure chamber 30 is discharged through the throttle valve 33 while being limited. As a result, cushion effect is applied to the piston 12, and the forward speed of the piston rod 13 is reduced.

When the piston 12 is to be returned from the forward position, compressed air in the head-side pressure chamber 35 is discharged from the supply/discharge port 38, and compressed air is supplied from the supply/discharge port 31 simultaneously. Then, the compressed air pushes and opens the cushion packing 27 from the recess 26, and enters into the rod-side pressure chamber 30 and thus, the piston 12 starts moving backward. Then, after the cushion ring 25 is pulled out from the cushion packing 27, the compressed air directly flows into the pressure chamber 30 from the recess 26 irrespectively of the cushion packing 27.

Figure 2:
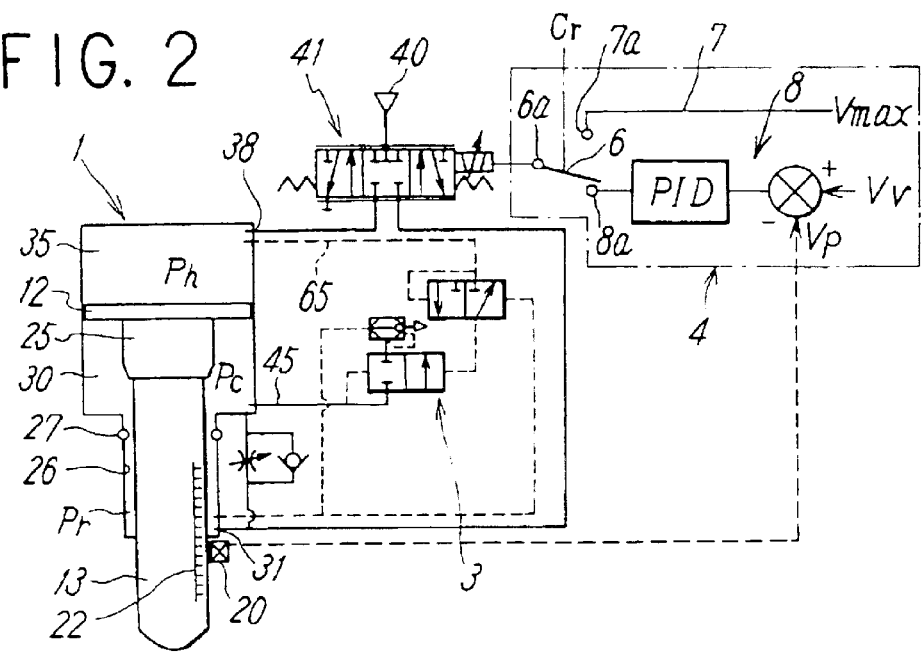
FIG. 2 shows a structure of a first embodiment of a high speed driving apparatus according to the present invention for actuating the pressure cylinder.

As shown in FIG. 2, a magnetic graduation 22 is provided on a side surface of the piston rod 13 to detect an operation position of the piston rod 13, and the rod cover 11 is provided with a position detector 20 for reading the magnetic graduation 22. By reading the magnetic graduation 22 by the position detector 20, a position of the piston rod 13 is detected, and a detected position signal Vp is fed back to a control section 4.

FIG. 2 shows a first embodiment of the high speed driving apparatus for actuating the pressure cylinder 1. In this high speed driving apparatus, the supply/discharge port 38 which is in communication with the head-side pressure chamber 35 of the cylinder 1 and the supply/discharge port 31 which is in communication with the rod-side pressure chamber 30 are connected to a servo valve 41, and an air pressure source 40 is connected to the servo valve 41. A detection signal from the position detector 20 is fed back to the control section 4 which controls the servo valve 41.

The servo valve 41 has a first communication position in which the supply/discharge port 38 is connected to the air pressure source 40 and the supply/discharge port 31 is opened into atmosphere, a second communication position in which the supply/discharge port 38 is opened into the atmosphere and the supply/discharge port 31 and the air pressure source 40 are connected to each other, and a neutral position in which both the supply/discharge ports 31 and 38 are closed. A solenoid is controlled by a control signal from the control section 4 so that the valve is switched to each of the above positions and the valve is arbitrarily opened and closed in accordance with the control signal, and pressure or flow rate in accordance with the control signal is output. When a control signal value from the control section 4 is zero, the valve is held at the neutral position by a spring, and the pressure chambers 35 and 30 are held in a state in which substantially the same pressure is applied to the pressure chambers 35 and 30.

The control section 4 comprises a signal circuit 7 which sends an operation signal as an electromagnetic switching valve to the servo valve 41, a control apparatus 8 which PID-controls the servo valve 41, and a switch 6 which selectively selects the signal circuit 7 and the control apparatus 8 as the servo valve 41. The signal circuit 7 supplies voltage Vmax to the servo valve 41 at the time of forward stroke of the piston rod 13, so that the servo valve 41 is operated as an ON/OFF type electromagnetic switching valve. At the time of backward stroke of the piston rod 13, the control apparatus 8 obtains a deviation between a set position signal Vv concerning the intermediate stopping position of the piston rod 13 which is set in an external controller (not shown) and a detected position signal Vp fed back from the position detector 20, and carries out PID calculation, and outputs a voltage in accordance with the deviation for controlling the servo valve 41. The switch 6 is operated by a switch signal Cr from an external controller and selectively connects a terminal 6a which is connected to the servo valve 41, to a terminal 7a connected to the signal circuit 7 and a terminal 8a connected to the control apparatus 8.

At the time of forward stroke of the piston rod 13 (forward operation step), the switch 6 is connected to the signal circuit 7 by the switch signal Cr, and the servo valve 41 is operated as ON/OFF switching valve if voltage Vmax is supplied. Therefore, compressed air is supplied to the head-side pressure chamber 35 from the compressed air source 40 in a stroke, pressure in the head-side pressure chamber 35 is increased, and the rod-side pressure chamber 30 is opened into atmosphere through the recess 26. Thus, the piston rod 13 moves forward at high speed, but the forward moving speed is reduced by the cushion mechanism in the vicinity of the forward stroke end and thus, a tip end of the piston rod 13 can touch the work softly.

On the other hand, at the time of backward stroke of the piston rod 13, the switch 6 is connected to the control apparatus 8 by the switch signal Cr, and the servo valve 41 is feedback controlled by the control apparatus 8. That is, the operation position of the piston rod 13 is detected by the position detector 20, the detected position signal Vp is fed back to the control section 4, and the servo valve 41 is controlled such that a deviation between the detected position signal Vp and the set position signal Vv input from an external controller becomes zero. As a result, pressures in the head-side pressure chamber 35 of the cylinder pressure 1, the rod-side pressure chamber 30 and the recess 26 are controlled, and the piston rod 13 is retreated to a set intermediate stopping position and stopped. At that time, substantially the same pressures are supplied to the pressure chamber 35, the pressure chamber 30 and the recess 26. That is, pressures in the head-side pressure chamber 35, the rod-side pressure chamber 30 and the recess 26 are held in their balanced state.

Therefore, when the piston rod 13 is reciprocated to carry out continuous operation, it is possible to stop the piston rod 13 at an arbitrary intermediate stopping position which was previously set in accordance with a projection and the like of the work. Thus, if the working stroke of the piston rod 13 is set to a shortest distance, a tip end of the piston rod 13 can move to a next operation position through a shortest path and thus, the operation time can be shortened. Further, in the intermediate stopping position of the piston rod 13, since a pressure enough to be balanced with the rod-side pressure chamber 30 is supplied to the head-side pressure chamber 35, it is possible to shorten a time for increasing a pressure of the head-side pressure chamber 35 from zero at the time of next forward stroke, and it is possible to shorten a time lag generated from an instant when stroke is switched to the forward stroke to an instant when the piston rod 13 actually starts the forward motion, i.e., starting delay.

In the above embodiment, the switch 6 is connected to the signal circuit 7 by the switch signal Cr at the time of the forward stroke of the piston rod 13, so that the servo valve 41 operates merely as a switching valve, but it is also possible to employ a structure in which the switch 6 is not provided and the control apparatus 8 is constituted such that it can output a driving voltage enough to allow the servo valve 41 to function as the switching valve at the time of the forward stroke of the piston rod 13, or in which pressurized fluid required for the forward stroke is supplied to the pressure cylinder from another switching valve.

In the pressure cylinder 1 having the above-described cushion mechanism, speed of the piston rod 13 is reduced in the vicinity of the end of the forward stroke. Therefore, the pressure cylinder 1 is effective for satisfying a requirement such as moderation of friction and collision sound of a tool such as an electrode chip or the like mounted to a tip end of the piston rod 13, which requirement is not satisfied by a cylinder for a conventional air-pressure type spot welding gun. When another working such as spot welding is carried out, however, a work is pressurized by a maximum pressurizing force after the piston rod 13 is decelerated, and if an internal pressure Pc in the pressure chamber 30 is gradually lowered while limiting the flow rate of the exhaust gas from the pressure chamber 30, timing for obtaining the maximum pressurizing force is largely delayed.

Figure 3:
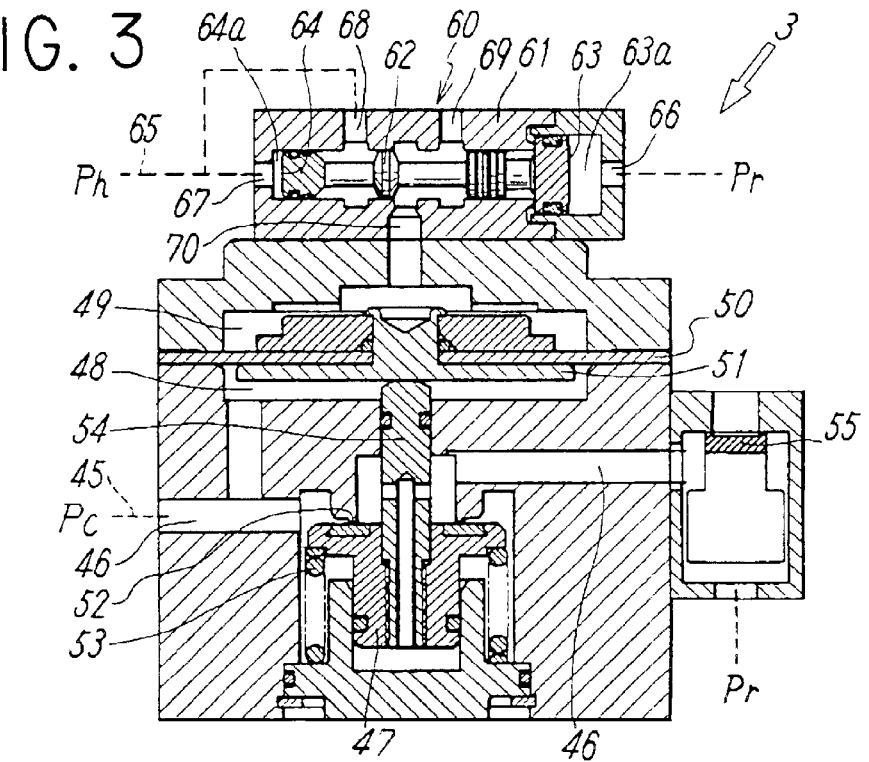
FIG. 3 is a sectional view clearly showing a structure of a quick exhaust valve of the first embodiment.

Thereupon, in this embodiment, a quick exhaust valve 3 shown in FIGS. 2 and 3 is provided for solving the problem of the pressurizing delay. This quick exhaust valve 3 detects that a pressure Pc in the rod-side pressure chamber 30 becomes lower than a pressure Ph in the head-side pressure chamber 35 at the time of cushion effect, and that a pressure of pressurized air discharged from the pressure chamber 30 through the throttle valve 33, i.e., a pressure Pr of the recess 26 becomes lower than a given low rate with respect to the pressure Ph in the pressure chamber 35, e.g., 35% or lower, and which acts as a trigger to operate the quick exhaust valve 3.

As shown in FIG. 3 in detail, the quick exhaust valve 3 comprises a diaphragm 50, two pressure receiving chambers 48 and 49 formed on opposite sides of the diaphragm 50, an exhaust path 46 which is in communication with the one pressure receiving chamber 48, a poppet type on-off valve 47 for opening and closing a valve seat 52 in the exhaust path 46, and a check valve 55 provided at an outlet of the exhaust path 46. The exhaust path 46 and the one pressure receiving chamber 48 are connected to the rod-side pressure chamber 30 through a passage 45, and the other pressure receiving chamber 49 is connected to the head-side pressure chamber 35 by a passage 65 through a differential pressure driving valve 60. Further, since the on-off valve 47 is operated in association with displacement of the diaphragm 50, a tip end of a stem 54 of the on-off valve 47 extends into the pressure receiving chamber 48, and the tip end abuts against a shell 51 fixed to the diaphragm 50. The on-off valve 47 is biased in a direction in which the valve seat 52 is closed by a spring 53. A pressure Pr in the recess 26 is applied to the check valve 55 as a back pressure.

The differential pressure driving valve 60 compares a pressure Pr in the recess 26 and a pressure Ph in the pressure chamber 35 with each other, and is operated when these pressures reach a given pressure ratio. This differential pressure driving valve 60 comprises a valve body 61 having a plurality of ports 66, 67, 68, 69 and 70; a valve member 62 accommodated in a valve hole of the valve body 61; pressure receiving surfaces 63 and 64 having different pressure receiving areas on opposite ends of the valve member 62; and pressure receiving chambers 63a and 64a for applying a pressure Pr in the recess 26 and a pressure Ph in the head-side pressure chamber 35 to the pressure receiving surfaces. The valve member 62 is switched from a position shown in FIG. 3 when the pressure Pr is reduced lower than a pressure Ph by a given low rate (which can be arbitrarily set), e.g., 35% or lower, thereby connecting the ports 70 and 68 with each other to introduce the pressure Ph in the passage 65 into a chamber 49 above the diaphragm 50. Therefore, an area difference is set between the pressure receiving surfaces 63 and 64 in accordance with the above rate. On the other hand, the valve member 62 assumes a position shown in FIG. 6 when the pressure Pr is higher than the pressure Ph by a given ratio which is given by areas of the pressure receiving surfaces 63 and 64, and the pressure receiving chamber 49 above the diaphragm 50 is opened into atmosphere through the port 69.

Figure 4:
FIGS. 4(A) to (C) are graphs of measurement results showing an operation state of the pressure cylinder when the pressure cylinder is driven by the high speed driving apparatus of the first embodiment.
Figure 4:
Figure 4:
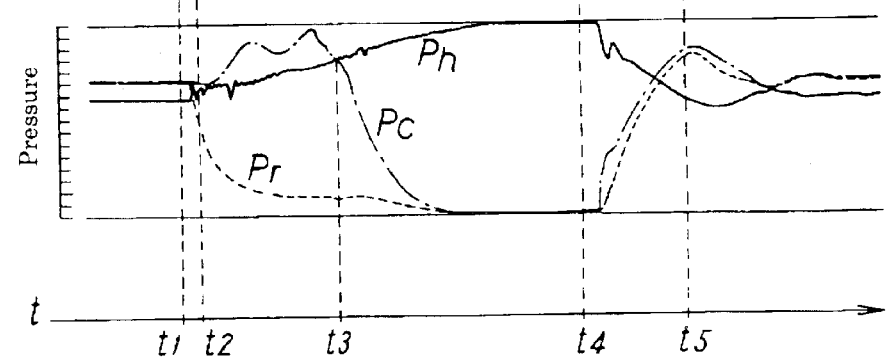

FIG. 4 show a measurement result in the operation state of the pressure cylinder 1 when the pressure cylinder 1 is driven by the high speed driving apparatus.

FIG. 4(A) shows the switch signal Cr for switching the forward stroke and the backward stroke of the piston rod 13, FIG. 4(B) shows a state of stroke of the piston rod 13, and FIG. 4(C) shows variation in pressures Pc, Ph and Pr in the pressure chambers 30, 35 and the recess 26.

From a state in which the piston rod 13 is retreated to the intermediate stopping position, at time t=t1, if the switch 6 is connected to the signal circuit 7 by the switch signal Cr and voltage Vmax is supplied to the servo valve 41, the servo valve 41 acts as a switching valve, brings the head-side pressure chamber 35 into communication with the compressed air source 40, and directly opens the rod-side pressure chamber 30 and the recess 26 into atmosphere. Therefore, the piston rod 13 is switched to the forward stroke, and at time t=t2, the piston rod 13 starts moving forward. At that time, since a pressure Ph which is substantially the same as that in the rod-side pressure chamber 30 has already been supplied to the head-side pressure chamber 35, it is unnecessary to pressurize the head-side pressure chamber 35 from zero and thus, a starting delay t2−t1 required until the piston rod 13 actually starts advancing is extremely short.

If the piston rod 13 starts advancing and reaches the end of the forward stroke, the cushion mechanism functions, the internal pressure Pc in the pressure chamber 30 which is limitedly opened into atmosphere through the throttle valve 33 is once increased, and the internal pressure in the recess 26 which is directly opened into atmosphere through the supply/discharge port 31 keeps lowering. The tip end of the piston rod 13 softly abuts against the work.

Thereafter, the internal pressure Pc in the pressure chamber 30 which is opened into the atmosphere through the throttle valve 33 starts lowering, and if the internal pressure Pc becomes lower than the internal pressure Ph, the quick exhaust valve 3 actuates and opens the pressure chamber 30 directly to the atmosphere and thus, the internal pressure Pc in the pressure chamber 30 is abruptly reduced to the atmospheric pressure. On the other hand, since the internal pressure Ph in the pressure chamber 35 reaches the maximum pressure, the pressurizing force of the piston rod 13 abutting against the work is abruptly increased and reaches the maximum value, processing of the work such as welding is carried out.

When the processing of the work is completed and the switch 6 is connected to the control apparatus 8 by the switch signal Cr at time t=t4, the piston rod 13 is switched to backward stroke, and the servo valve 41 is feedback controlled based on the position information of the piston rod 13. That is, a portion of compressed air in the head-side pressure chamber 35 is discharged to the atmosphere and at the same time, compressed air is supplied to the rod-side pressure chamber 30 from the compressed air source 40, the pressure toward the piston rod 13 is released, and the piston rod 13 starts retreating operation at time t=t5. If the piston rod 13 is retreated to the set intermediate stopping position, the internal pressures Ph and Pc in the pressure chambers 35 and 30 are controlled such that they are substantially balanced, and the procedure is proceeded to a next step.

Figure 5A:
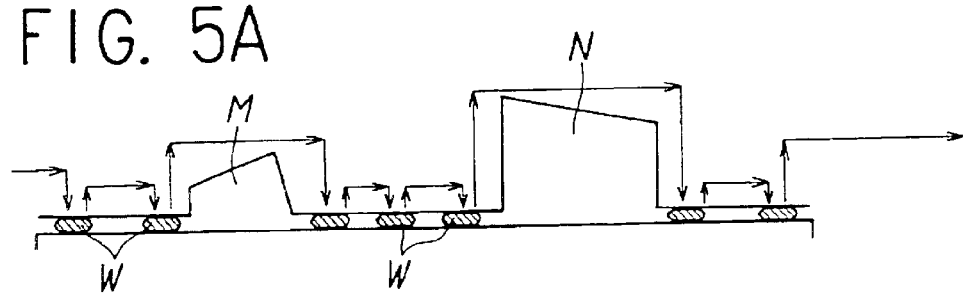
FIGS. 5(A) and (B) show comparison of a moving path of an electrode chip when a quick pressurizing apparatus of the first embodiment and the proposed apparatus are applied to the pressure cylinder of a spot welding apparatus.
Figure 5B:
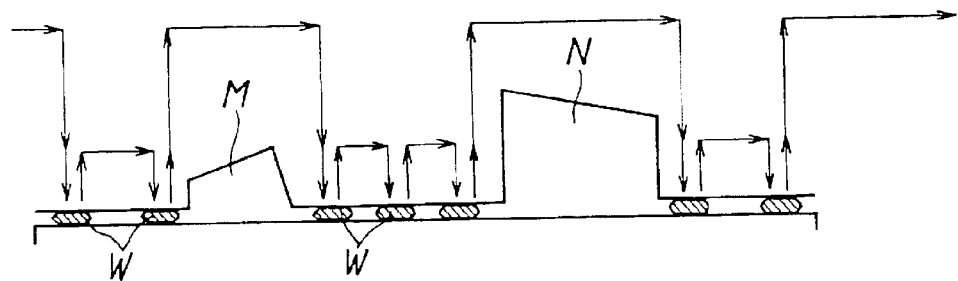

FIG. 5 show, in comparison, strokes (see straight lines having arrows) of a case (A) in which the pressure cylinder 1 is controlled by the high speed driving apparatus of the first embodiment, and a case (B) in which the pressure cylinder 1 is controlled by the above proposed apparatus. In the case of the proposed apparatus, the backward stroke of the piston rod 13 can only be set into the two positions, i.e., the totally returning position and the specific intermediate stopping position, and since a plurality of working strokes can not be set in accordance with heights of obstacles M and N, a waste is generated in the moving path of the tip end of the piston rod 13, i.e., the electrode chip. According to the high speed driving apparatus of the first embodiment of the present invention, since the intermediate stopping position can arbitrarily be set, it is possible to set a working stroke which makes the moving path of the electrode chip as short as possible and as a result, the processing time can be shortened. In the drawings, W indicate a welding portion.

Figure 6:
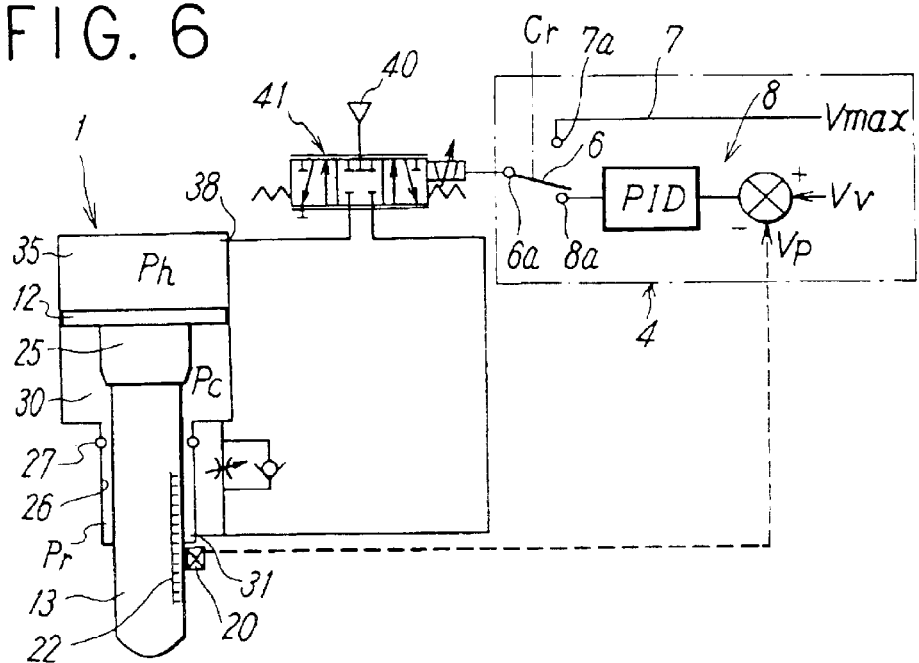
FIG. 6 shows a structure of a second embodiment of the high speed driving apparatus of the present invention.

FIG. 6 shows a second embodiment of the present invention. The second embodiment corresponds to the first embodiment except that the quick exhaust valve 3 of the high speed driving apparatus is omitted. Since the high speed driving apparatus of this embodiment does not have the quick exhaust valve 3, time required from an instant when the cushion mechanism functions to an instant when the maximum pressurizing force is obtained becomes longer than that in the first embodiment. The second embodiment may be employed in accordance with kind of operation carried out by the piston rod 13 or properties of a work. The cushion mechanism may be omitted if necessary. Other structure and effect are the same as those in the first embodiment and thus, essential portions are designated with the same symbols and explanation thereof is omitted to avoid redundancy.

As described above, according to the present invention, there are provided a driving method and a driving apparatus in which a totally returning position and an operation preparing position (intermediate stopping position) to which a piston rod 12 is opposed to a work through a relatively short working stroke are set in the piston rod 12 of a pressure cylinder such as a spot welding gun, the intermediate stopping position can arbitrarily be set by a signal sent from outside so that a waste is not be generated in a stroke in accordance with a shape of the work and the like.

The driving delay caused when the conventional pressure cylinder is driven by a switching valve is eliminated as small as possible by maintaining a state in which substantially the same pressures are applied to the opposite side pressure chambers of the piston 12 located at a returning position.

What is claimed is:

1. A high speed driving method of a pressure cylinder comprising:

an advancing working step for driving a piston of a pressure cylinder by air pressure supplied and discharged from a servo valve to move a piston rod to a forward stroke end, to thereby pressurize a work to carry out a predetermined operation;

an intermediate stopping step for retreating the piston rod to an intermediate stopping position and stopping the piston rod at the intermediate stopping position; and a speed reducing step for reducing a speed of the piston rod in a vicinity of the forward stroke end by a cushioning function generated by limiting a flow rate of exhaust gas from a rod-side pressure chamber, wherein the intermediate stopping step comprises: a process for detecting an operation position of the piston rod by a position detector and feeding back a detected position signal to a control apparatus of the servo valve; a process for controlling the servo valve by the control apparatus such that a deviation between the detected position signal and a set position signal for intermediate stopping of the piston rod becomes zero, thereby stopping the piston rod at a set position; and a process for maintaining a state in which substantially same pressures are supplied to pressure chambers on opposite sides of the piston; wherein during the speed reducing step, if an internal pressure in the rod-side pressure chamber at the time the cushioning effect function becomes less than an internal pressure in a head-side pressure chamber, actuation of a quick exhaust valve is triggered to directly open the rod-side pressure chamber into atmosphere, and to reduce a piston back pressure, to shorten a time until a maximum pressuring force is generated by the piston rod.

2. The driving method according to claim 1, wherein when the advancing working step is started, a predetermined voltage is supplied to the servo valve to allow the servo valve to function as an on/off switching valve.

3. A high speed driving apparatus of a pressure cylinder, comprising:

a pressure cylinder comprising a piston configured to be driven by an air pressure, a piston rod connected to the piston, and a head-side pressure chamber and a rod-side pressure chamber formed on opposite sides of the piston;

a servo valve connecting both the pressure chambers to an air pressure source;

a control section configured to control the servo valve; and a position detector configured to detect an operation position of the piston rod to feed back a detected position signal to the control section; wherein the high speed driving apparatus further comprises a control apparatus configured to function such that the control section compares the detected position signal fed back from the position detector and a set position signal to stop the piston rod as previously set, and to control the servo valve such that a deviation between both the signals becomes zero, to thereby stop the piston rod at a set position, and to maintain a state in which substantially same pressures are supplied to the pressure chambers formed on opposite sides of the piston, wherein the pressure cylinder comprises a cushioning mechanism configured to reduce a speed of the piston rod in the vicinity of an end of a forward stroke of the piston by limiting a flow rate of an exhaust gas from the rod-side pressure chamber, and a quick exhaust valve is connected to the pressure cylinder and is configured, if an internal pressure in the rod-side pressure chamber at the time of the cushioning effect function becomes less than an internal pressure in the head-side pressure chamber, to act as a trigger to actuate the quick exhaust valve to directly open the rod-side pressure chamber into atmosphere.

4. The driving apparatus according to claim 3, wherein the control section further comprises a signal circuit configured to supply a given voltage to the servo valve when advancing of the piston rod is started to allow the servo valve to function as an on/off switching valve, and a switch configured to be actuated by the switch signal to selectively connect the signal circuit and the control apparatus to the servo valve.

* * * * *